United States Patent [19]

Trunner

[11] Patent Number: 5,337,806

[45] Date of Patent: Aug. 16, 1994

[54] METHOD AND DEVICE FOR HEATING OR COOLING A REACTION FLASK

[75] Inventor: Josef Trunner, Mönchaltorf, Switzerland

[73] Assignee: Buchi Laboratoriums-Technik AG, Flawil, Switzerland

[21] Appl. No.: 900,426

[22] Filed: Jun. 18, 1992

Related U.S. Application Data

[63] Continuation of Ser. No. 422,596, Oct. 17, 1989, abandoned.

[30] Foreign Application Priority Data

Oct. 28, 1988 [CH] Switzerland ............... 3925/88-7

[51] Int. Cl.⁵ .................... B01L 9/00; F28F 13/00; F28D 1/00
[52] U.S. Cl. ........................ 165/47; 422/63; 165/108; 62/64; 62/376; 137/571; 137/577
[58] Field of Search ............ 62/376, 64, 376; 165/108, 80.5, 115, 1, 2; 137/571, 577; 422/63

[56] References Cited

U.S. PATENT DOCUMENTS

| | | | |
|---|---|---|---|
| 2,001,344 | 5/1935 | Fielder | 165/108 |
| 2,225,498 | 12/1940 | Hollander | 137/577 |
| 2,286,225 | 6/1942 | Noyes | 62/64 |
| 2,288,137 | 6/1942 | Jones | 165/80.5 |
| 2,618,127 | 11/1952 | Shipman | 165/108 |
| 2,891,574 | 6/1959 | Dahlberg | 137/577 |
| 3,139,904 | 7/1964 | Wengel | 137/577 |
| 3,214,153 | 10/1965 | Hauff et al. | 165/108 |
| 3,370,454 | 2/1968 | Flores | 165/108 |
| 3,468,136 | 9/1969 | Swenson et al. | 62/64 |
| 3,524,457 | 8/1970 | Laimbock | 137/577 |
| 3,858,642 | 1/1975 | Battison et al. | 137/577 |
| 3,888,092 | 6/1975 | Fisher | 62/376 |
| 4,246,927 | 1/1981 | Eberle | 137/571 |
| 4,349,267 | 9/1982 | Ohtami | 137/577 |
| 4,625,935 | 12/1986 | Zellweger | 248/297.1 |

FOREIGN PATENT DOCUMENTS

| | | | |
|---|---|---|---|
| 1115889 | 12/1954 | France | 62/435 |
| 1370751 | 7/1963 | France | 62/435 |
| 1541905 | 3/1979 | United Kingdom | 62/64 |

*Primary Examiner*—John K. Ford
*Attorney, Agent, or Firm*—Shoemaker & Mattare, Ltd.

[57] ABSTRACT

The bath (4) is arranged the supply reservoir (5) for the liquid (3), in which the reaction flask to be heated or cooled can be immersed. The heating or cooling device (8) is arranged on the bottom of the supply reservoir (5). The liquid (3) is delivered with an immersion pump (19) through a feed pipe (6) and an opening (18) in the bottom of the bath (4). The level of the liquid in the bath (4) can be adjusted with the aid of a slider (11). The liquid flows back into the supply reservoir (5) over an overflow (7). When the pump (19) is switched off, the liquid (3) in the bath (4) flows independently back into the supply reservoir (5).

10 Claims, 8 Drawing Sheets

METHOD AND DEVICE FOR HEATING OR COOLING A REACTION FLASK

This is a continuation of application Ser. No. 07/422,596, filed Oct. 17, 1989.

The invention relates to a method and a device for heating an object, in particular a reaction flask. Flasks for carrying out chemical reactions must in most cases be heated or cooled. For this purpose baths are used into which the reaction flask is either completely or partially immersed. A typical example of application in the laboratory for this type of basin is the rotary evaporator, the bath of which is filled with hot water, or hot oil for higher temperatures.

As with many other procedures, when distilling with a rotary evaporator, interruption of the heating procedure is also required without delay after a certain time or when a certain reaction is accomplished. This is achieved by raising the reaction flask together with the glass fittings, so that it is no longer immersed in the hot liquid. These baths have in all cases, however, the disadvantage of being relatively sluggish, so that the interruption of either the heating or respectively the cooling procedure is in many cases insufficient to cut short a given reaction.

For these reasons so called rapid lift supports are employed, with rotary evaporators, which are either set under spring tension and/or equipped with a drive motor, so that the reaction flask can be raised out of the bath as quickly as possible. In certain cases the bath is also lowered. It is evident that these types of lifting or lowering devices are very complicated. With automatic devices equipped with time switching and electric drive there is the additional risk that, due to a power cut for example, the reaction flask will remain immersed in the hot bath, so that undesireable reactions result. Finally, handling over the hot liquid-filled bath presents a constant danger of potential burn injuries, especially in the case of oil baths.

It is therefore an object of the invention to provide a method of the type mentioned above, whereby a complicated lifting device is no longer required for interruption of the heating or the cooling procedure. The device should be simple and easy to operate, and exhibit as much operational safety as possible. In addition, heat control should be optimised. This object is achieved with the present invention.

With this invention the heating and cooling procedure no longer takes place immediately in or around the vessel in which the reaction flask is immersed. Furthermore, heat is applied to or extracted from the liquid in a separate vessel, and this liquid is then fed to the bath in which the reaction flask is placed. In order to end the reaction, the delivery is interrupted and the bath is emptied within the shortest possible time. Lifting and lowering of the bath is no longer nescessary, and as a result considerably simpler supports can be employed. The volume of the liquid can at the same time perhaps be reduced since the shape of the basin can be optimally adjusted to the shape of the reaction flask.

An especially high level of operational safety and optimum heat control can be aimed for if the supply reservoir is placed beneath the bath, and if the bath at least partly closes-off the supply reservoir. The supply reservoir containing the hot or the cold liquid is thus completely covered, and only exceptionally small liquid losses will occur through evaporation when not in use. In addition, the bath is empty when not in use, so that there is no risk of an object falling into the liquid during handling.

Further advantages can be gained if the liquid outlet in the bath is formed as an adjustable overflow, for example as a height adjustable slider in the wall of the bath, with which the liquid level can be set. By this method the liquid level can be quickly adjusted to the size of the reaction flask to be immersed. The liquid displacement of the reaction flask must no longer be taken into account, as has until now been the case, since when immersing a larger flask, the excess liquid simply runs off through the overflow. Handling by the operator is thus considerably simplified.

Special advantages could also be gained if the bath is formed in two parts and if the bath body, fixed in relation to the supply reservoir, possesses a dispaceable vertical side-wall. With the aid of the displaceable bath side-wall it is evident that the capacitiy of the bath can be changed. At the same time the bath side-wall can itself form the overflow for limiting the liquid level in the bath. Thus also the liquid level can be adjusted through displacing the bath side-wall.

It is especially advantageous if the displaceable bath side-wall is guided on the bath body. This is especially simply achieved if the plan shape of the bath is rotationally symmetrical. It could however possess another basic shape. The displaceable bath side-wall is preferably of cylindrical shape in this version. It could also take the form of a bellows, supported and guided in a suitable way.

The displaceable bath side-wall could, for example, be adjusted manually to the desired height and fixed in a suitable way to the bath body, An especially suitable displacement method for the bath side-wall will result, however, if an upright float is located in the bath body which has sufficient buoyancy to displace the bath side-wall from its lower rest position to its upper operating position when the liquid is introduced into the bath. The upper operating position can also be adjustable with the use of a mechanical stop. By this method the bath side-wall will automatically be positioned upwards, and will remain in this position until the liquid is once again drained from the bath. Then the bath side-wall will return to the lower rest position. This has the advantage that the bath requires little space when not in operation, so that handling over the bath will be free and unobstructed. The maximum bath height will only be reached when the device is put into operation. The float is preferably formed as a hollow chamber, with an open underside. This type of float is easy to manufacture and possesses sufficient buoyancy from the air trapped inside it.

For an optimum return flow of the liqid the displaceable side-wall is formed as a hollow wall, whereby the inner rim forms the overflow and the outer rim of the hollow wall is somewhat higher than the inner rim. The outer rim can thus function as a protection for the overflow.

If the feed pipe is leads to an opening in the bottom of the bath, and if the feed pipe has a gradient from the opening down to the supply reservoir, emptying of the bath can ensue without pumping. At the same time the use of a special valve can be dispensed with if the circulation device is an immersion pump, situated in the supply reservoir and connected to the feed pipe. As soon as the immersion pump is switched off, the liquid drains out of the bath through the immersion pump back into the supply reservoir. The return flow rate is thereby a question of the dimensions of the feed pipe and the pump. Obviously, it would also be possible to suck the liquid out of the bath by reversing a suitable pump.

If the bath has a form which is at least partly concave, glass flasks which are normally employed for distillation can be especially simply placed in the bath without a supporting surface. Furthermore, the bath shape is optimally suited to these types of flasks, so that the amount of liquid can be kept to a minimum. The opening in the bath bottom through which the liquid flows is preferably so arranged that a turbulent flow results. In this way even a stationary flask will be rapidly warmed so that in certain cases rotation of the flask can be dispensed with.

Further advantages and characteristics of the invention arise out of the following descriptions and drawings, wherein.

Figure 1:
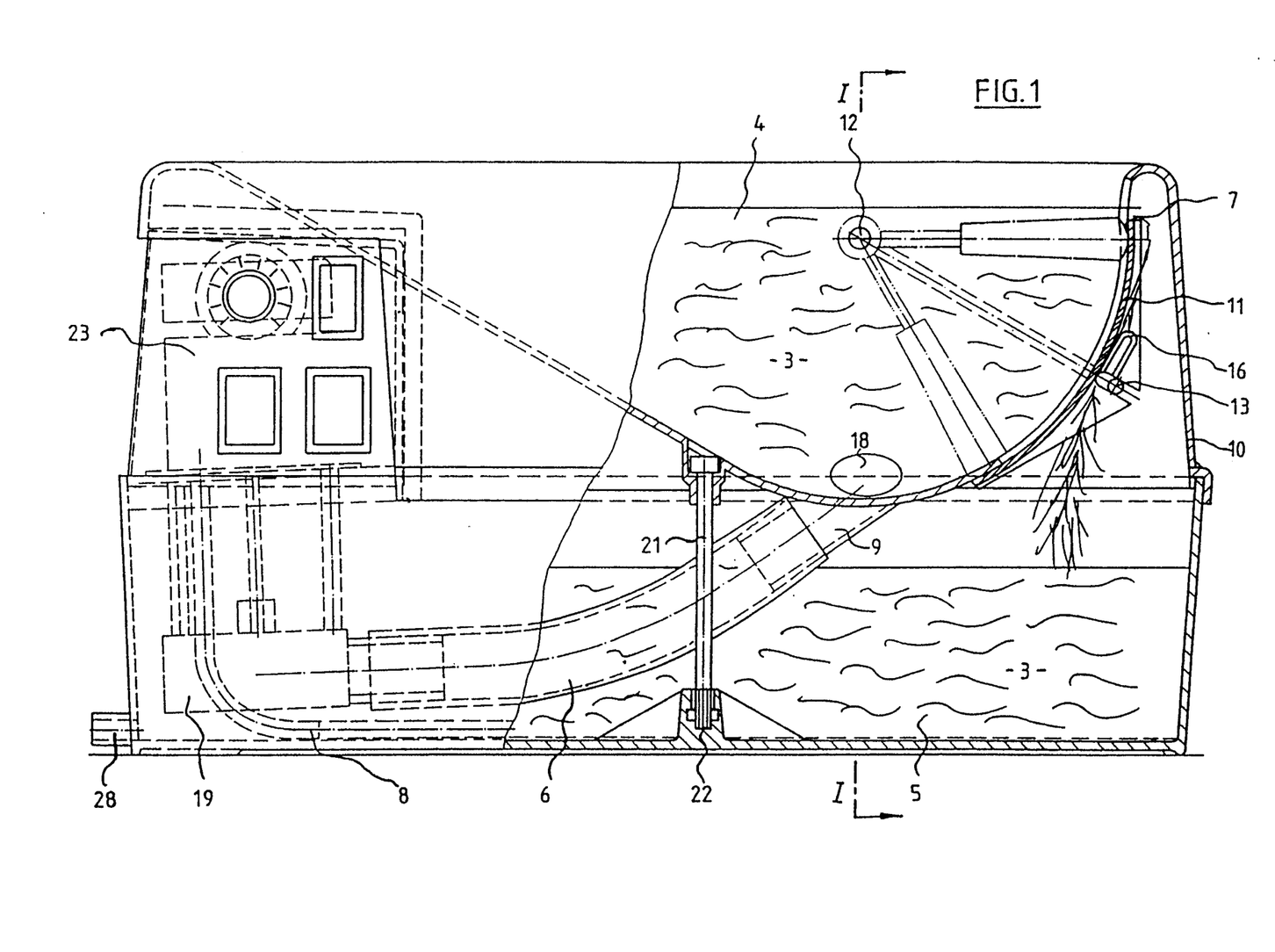
FIG. 1 is a partly cross-sectional view of a device according to the invention.
Figure 2:
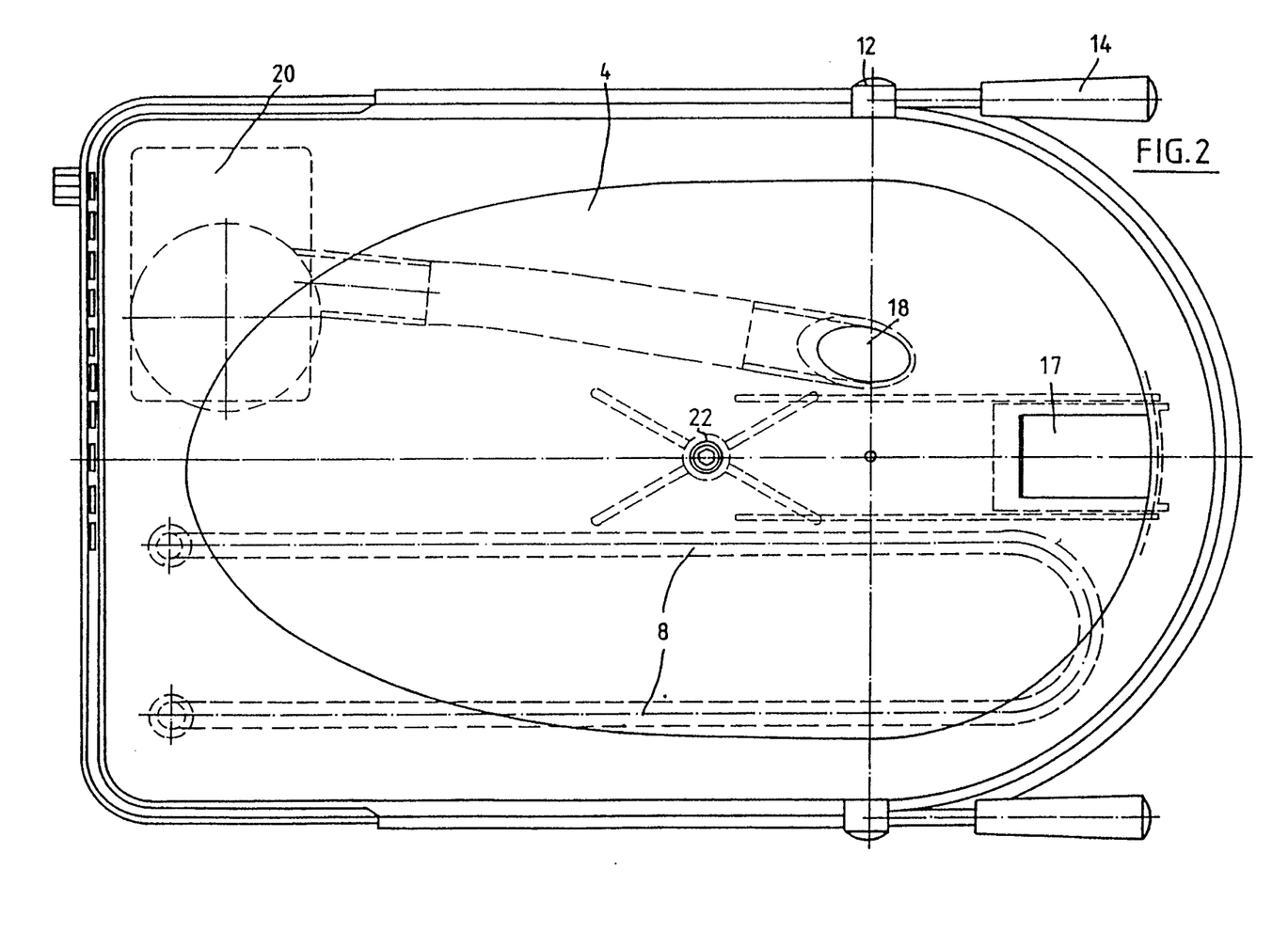
FIG. 2 is a plan view of the device according to FIG. 1.
Figure 3:
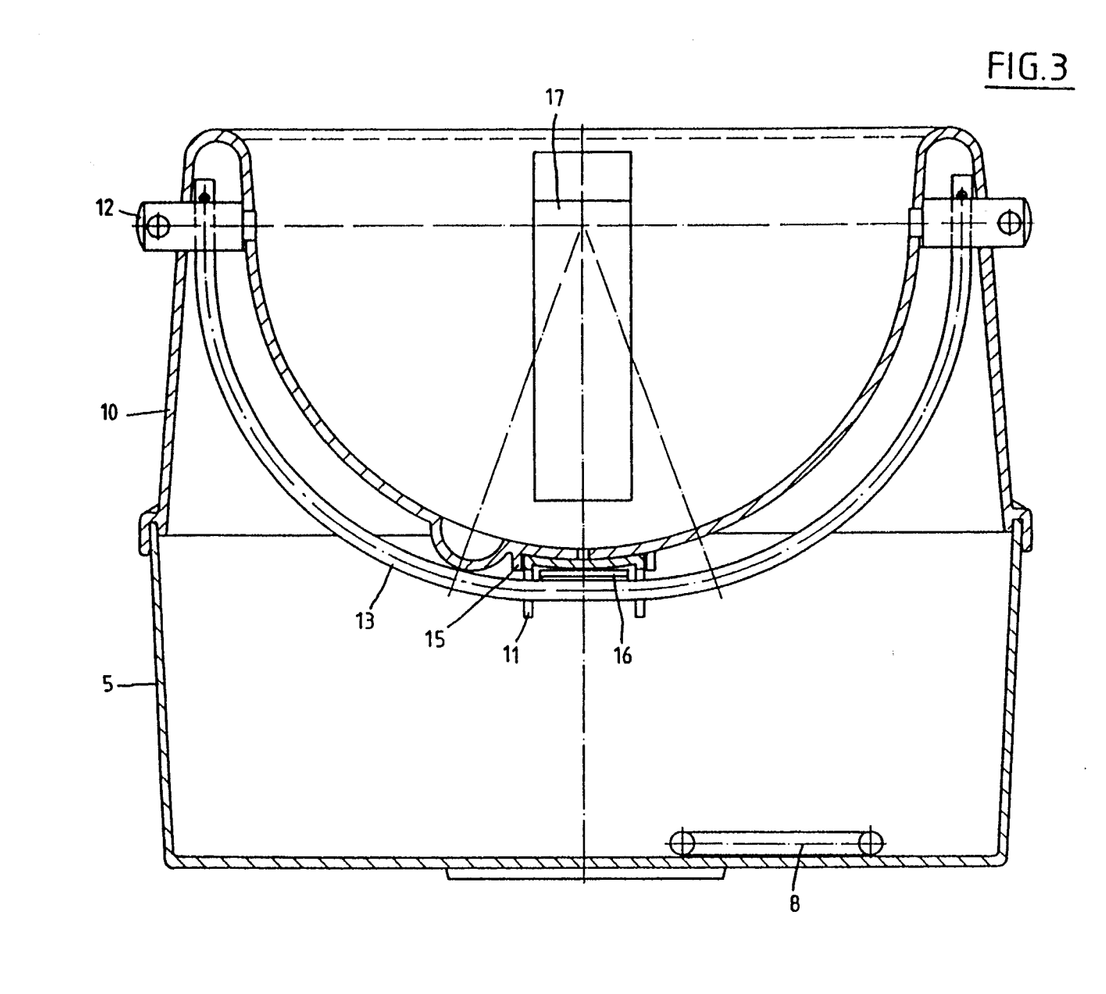
FIG. 3 is a cross section through the line I-I as shown on FIG. 1.

As can be observed in FIGS. 1 to 3, the device according to the invention comprises essentially two housing sections, namely a supply reservoir 5 and a basin 4 supported upon it. The basin 4 is at the same time arranged as a lid 10 which virtually hermetically seals the supply reservoir 5. These two housing sections can, for example, be made out of a plastic material or metal.

As can be seen in FIGS. 1 and 3, the volume of the reservoir is somewhat greater than that of the basin.

A threaded lug 22 is located on the bottom of the supply reservoir 5 which can be strengthened with ribs as depicted. The basin 4 can then be fastened to the supply reservoir 5 with the aid of a screw 21 which is screwed into the threaded lug 22.

The basin, according to this version, has a cross sectional form which tapers from right to left, whereby the right section of the basin is somewhat ball shaped. This shape is especially optimally suited to obliquely immersed distillation flasks, as can be observed in FIGS. 5 and 6.

A slot 17 is arranged on the right side of the basin 4, which extends through an angle of slightly more than 60 degrees. This slot can be partly or totally closed off with the use of a slider 11, which is pressed from outside against the bath wall. The slider 11 travels in a guide 15, which is formed by two parallel ribs on the outer surface of the basin wall.

An approximately semi-circular bow shaped plate 13 is attached to linkage arms 12 on both sides of the bath 4 for activation of the slider. The semi-circular bow shaped plate 13 slots into the slider 11 and can be pivotted from outside with the aid of a lever 14. A spring 16 is tensioned between the bow shaped plate 13 and the slider 11, so that the slider is pressed against the basin wall in order to seal it. The resulting pressure is sufficient to hold the slider in the required position. Obviously, other arrangements for the slider and its activation could be considered.

A liquid outlet 7 is created with the aid of the slider, whereby the level of the liquid 3 in the basin is adjusted in accordance with the slider position.

An opening 18 is provided, slightly offset in the bottom of the basin which opens out into a connection sleeve 9. A feed pipe 6 is connected onto this sleeve, which leads with a gradient from the opening 18 down to the bottom of the supply reservoir 5. The feed pipe is connected at its lower end to an immersion pump 19, which is submerged in the liquid 3 in the supply reservoir 5.

The immersion pump 19 is driven by a motor 20 which is placed immediately under the basin 4. The feed pipe 6 is preferably in the form of a flexible hose which can be fastened onto both the immersion pump outlet and the connecting sleeve 9.

A heating device 8, in the form of a heating element which extends almost the entire length of the reservoir, is located at the side, next to the immersion pump and its feed pipe, on the bottom of the supply reservoir 5. A cooling unit could also be immersed in a similar way in the liquid 3 in the supply reservoir. The heating arrangement 8, together with the immersion pump 19, and also the motor 20, is fastened to the underside of the bath 4, so that the entire unit can be raised clear of the supply reservoir 5 by releasing the fixing screw 21. The scavenge level of the immersion pump 19 lies slightly above the level of the heating arrangement, so that the heating element always remains covered by liquid, even when the liquid volume is insufficient. Too low a liquid level will make itself apparent through an excessive 'gurgling' pump noise, and heavy vapour formation. Additionally, a thermostat can be provided as a protection against overheating.

A drain, in the form of a sleeve 28, can be provided for emptying the supply reservoir 5. It would also be conceiveable and suitable to include a level gauge operating with a float to check the level in the supply reservoir, or to provide a transparent section marked with a scale in the side of the supply reservoir 5. The different functions such as, for example, pump on/off, heating on/off, or temperature adjustment can be actuated from an operating panel 23.

In operation, the liquid 3, stored in the supply reservoir 5, can be heated to the required operating temperature with the heating arrangement 8. In order to avoid excessive waiting times, the heating arrangement can remain permanently switched on. For a distillation procedure, the reaction flask 2 can be introduced into the empty basin 4 with the aid of a support, and the desired liquid level can be adjusted with the slider 11. The immersion pump is subsequently activated so that the heated liquid 3 is pumped through the feed pipe 6 and the opening 18 into the basin 4. The basin 4 is filled up to the desired level and the liquid then flows through the slot 17 and over the overflow 7 back again into the supply reservoir 5. As soon as interruption of the heating procedure in the bath 4 is required, the immersion pump is switched off, which could also ensue automatically through a time switch, and the liquid subsequently flows back immediately through the feed pump 6 and the pump 19 into the supply reservoir. The same procedure will also ensue in the case of an unforeseen power failure, for example, so that a reaction taking place in the flask will be interrupted immediately.

For certain applications it would also be conceiveable to pour the heated or cooled liquid over the reaction flask from above, and to use the basin 4 only as a collector and drain. A combination of feeding the liquid into the bottom of the basin and pouring it over the reaction flask would also be conceiveable.

Figure 4:
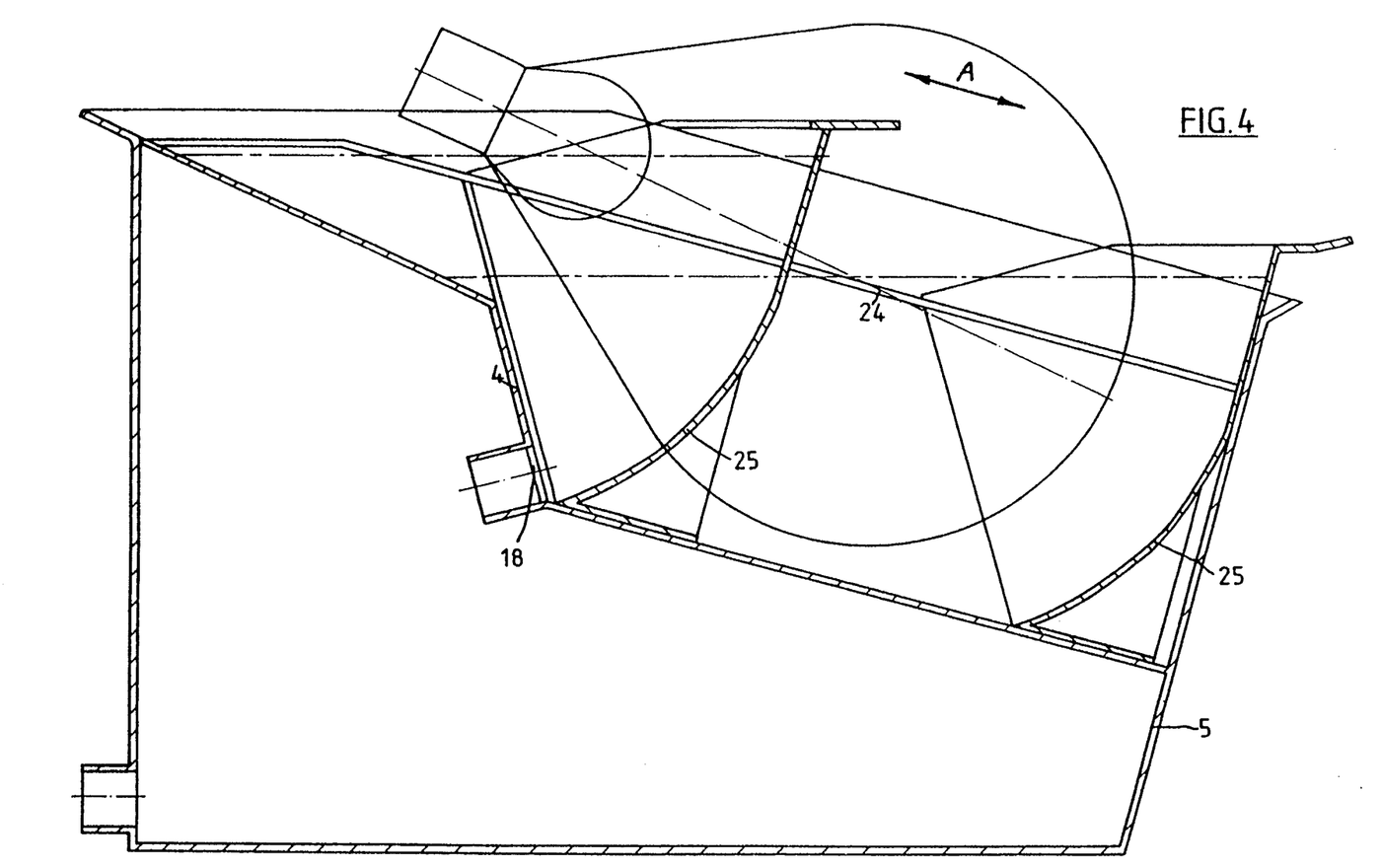
FIG. 4 is a cross section of an adapted version with sideways slideable bath side-wall.

In FIG. 4 an alternative version is depicted, in which the wall of the basin possesses a sloping rim. The basin is equipped with a sidewall 25 which is arranged to slide in the direction A inside the bath. In this way the bath capacity, and with that the liquid content, can be altered. The drawing shows the sidewall 25 at the extreme right, for the largest possible bath capacity, and at the extreme left, for the smallest possible capacity. The opening 18 is arranged in such a way that it will not be covered by the sliding side-wall in any position. Through the slope of the basin rim 24, the liquid level in the bath 4 can also be adjusted according to the position of the slideable side-wall. The liquid will flow out over it where the basin rim crosses the side-wall 25, either on both sides or only on one side, depending on the configuration of the basin rim. The immersion pump and heating arrangement are not shown in the version depicted in FIG. 4. These components could, however, be the same or similar to those included in the version depicted in FIG. 1.

Figure 5:
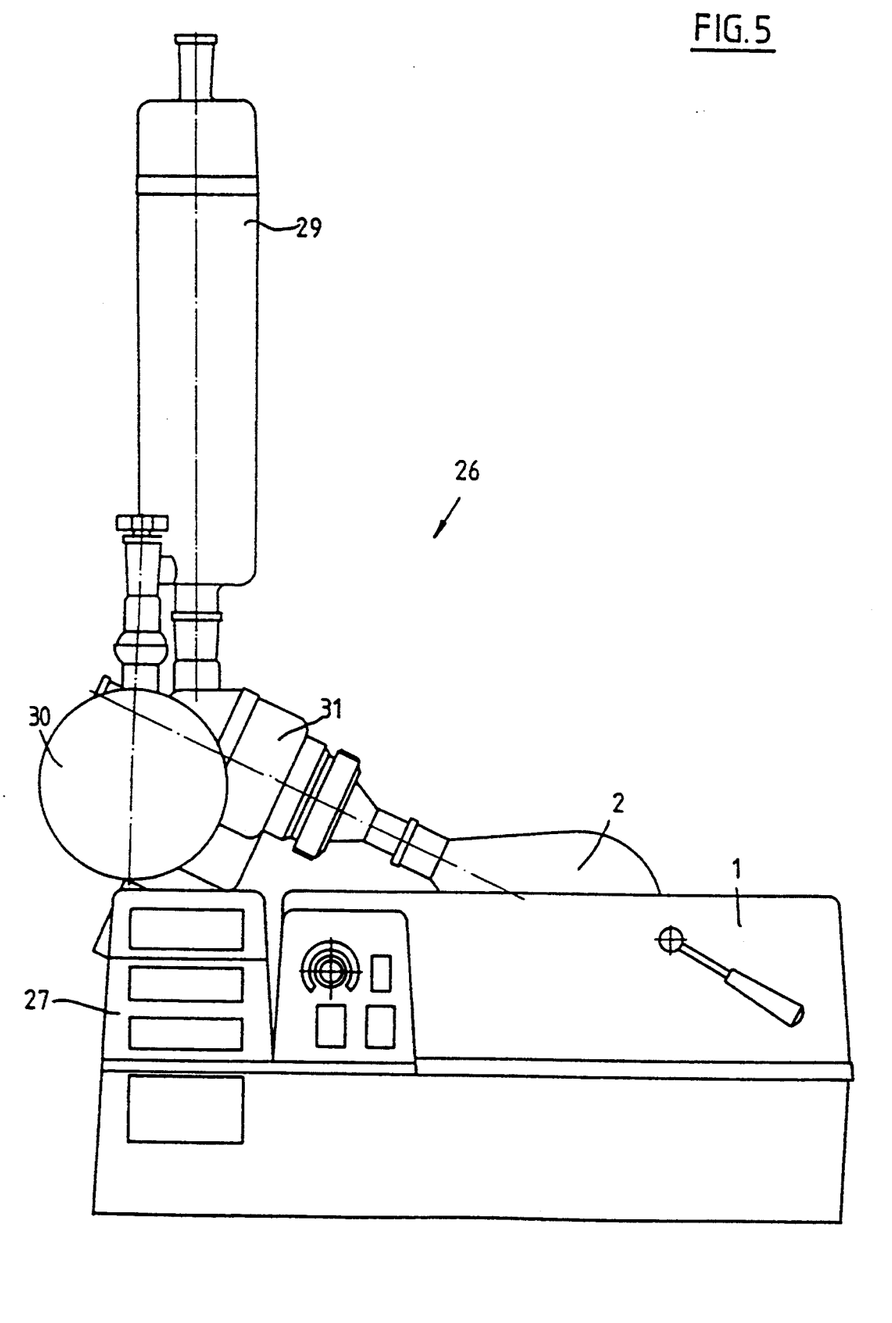
FIG. 5 shows the device in use with a rotary evaporator.
Figure 6:
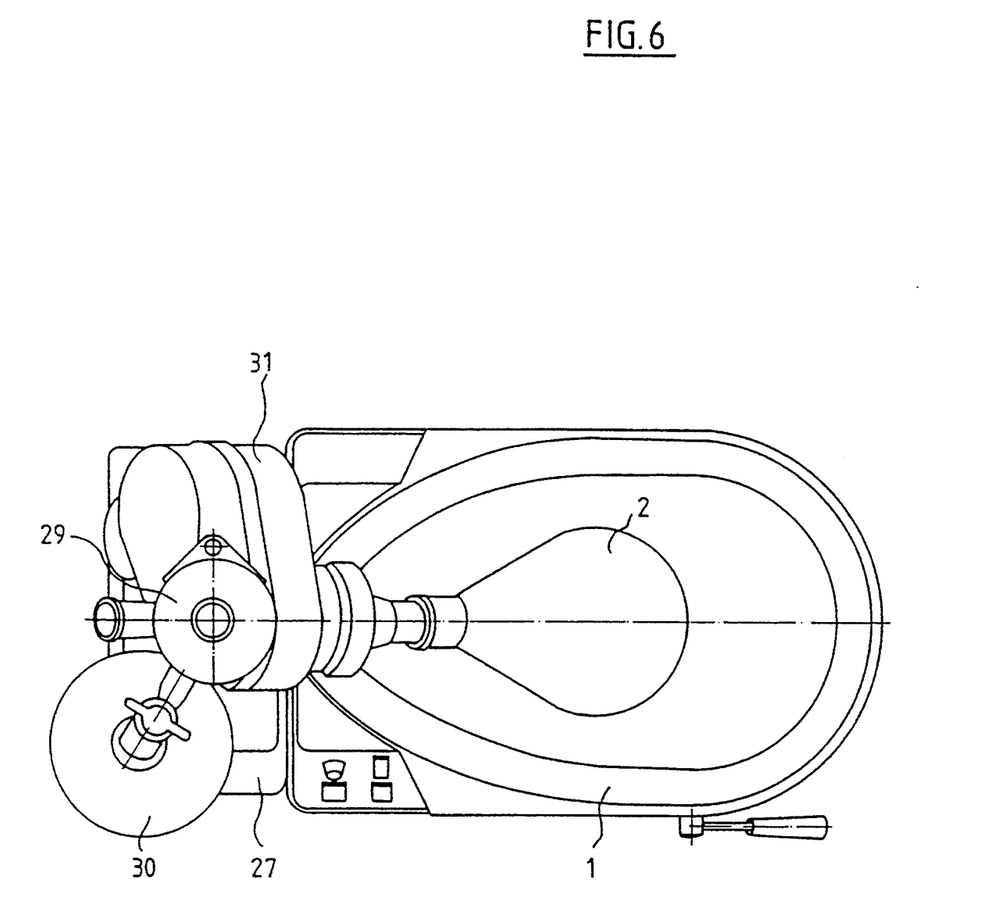
FIG. 6 is a plan view of the evaporator arrangement according to FIG. 5.

The bath 1, according to the invention, is depicted in FIGS. 5 and 6 in use with a rotary evaporator 26. The rotary evaporator consists in principle of a support 27 which, however, no longer requires a rapid lift device. The reaction flask 2 is fitted to a drive device 31 which can rotate it along its axis. A cooler 29 and a distillation flask 30 are attached to the support.

Figure 7:
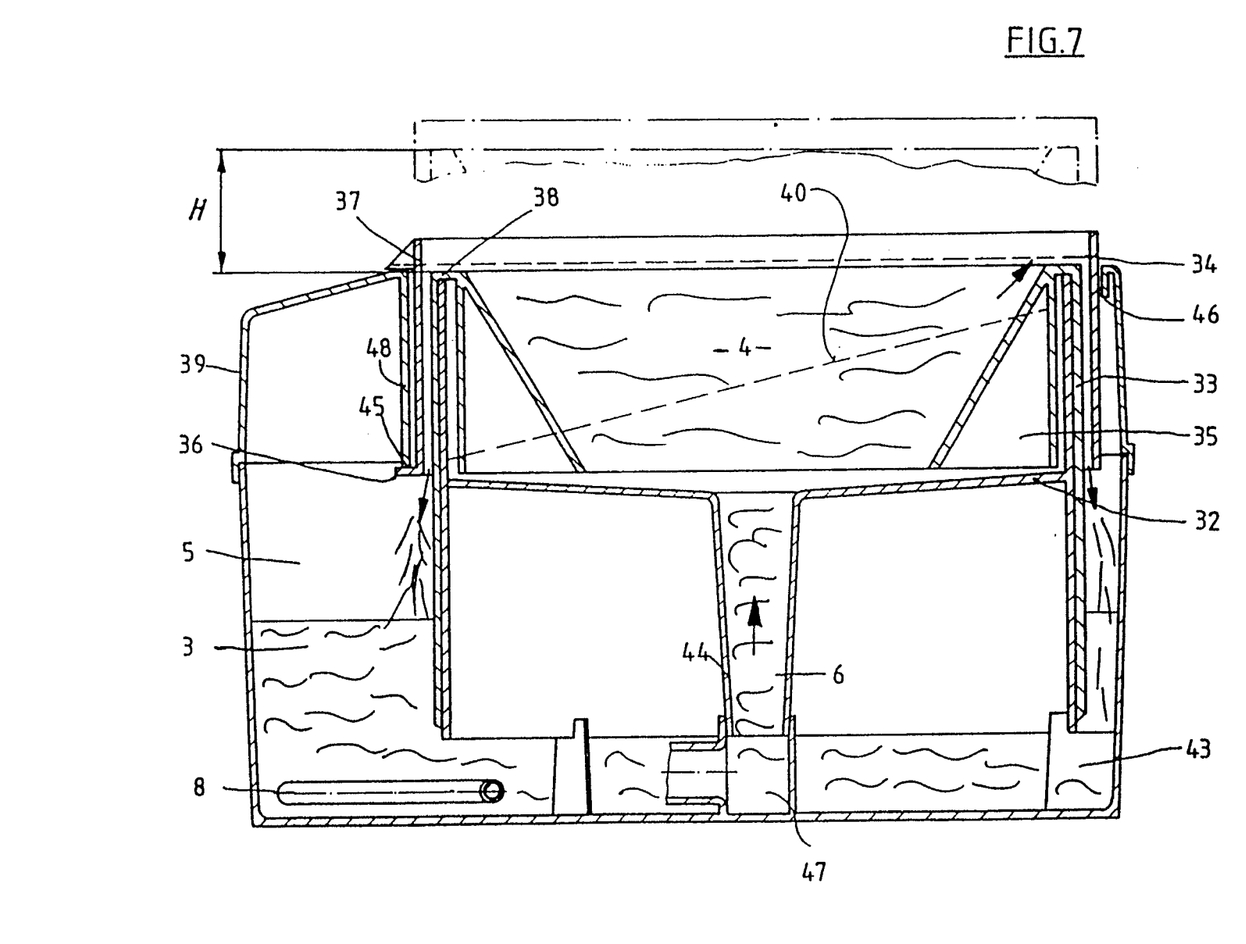
FIG. 7 is a further version with vertically displaceable bath rim.
Figure 8:
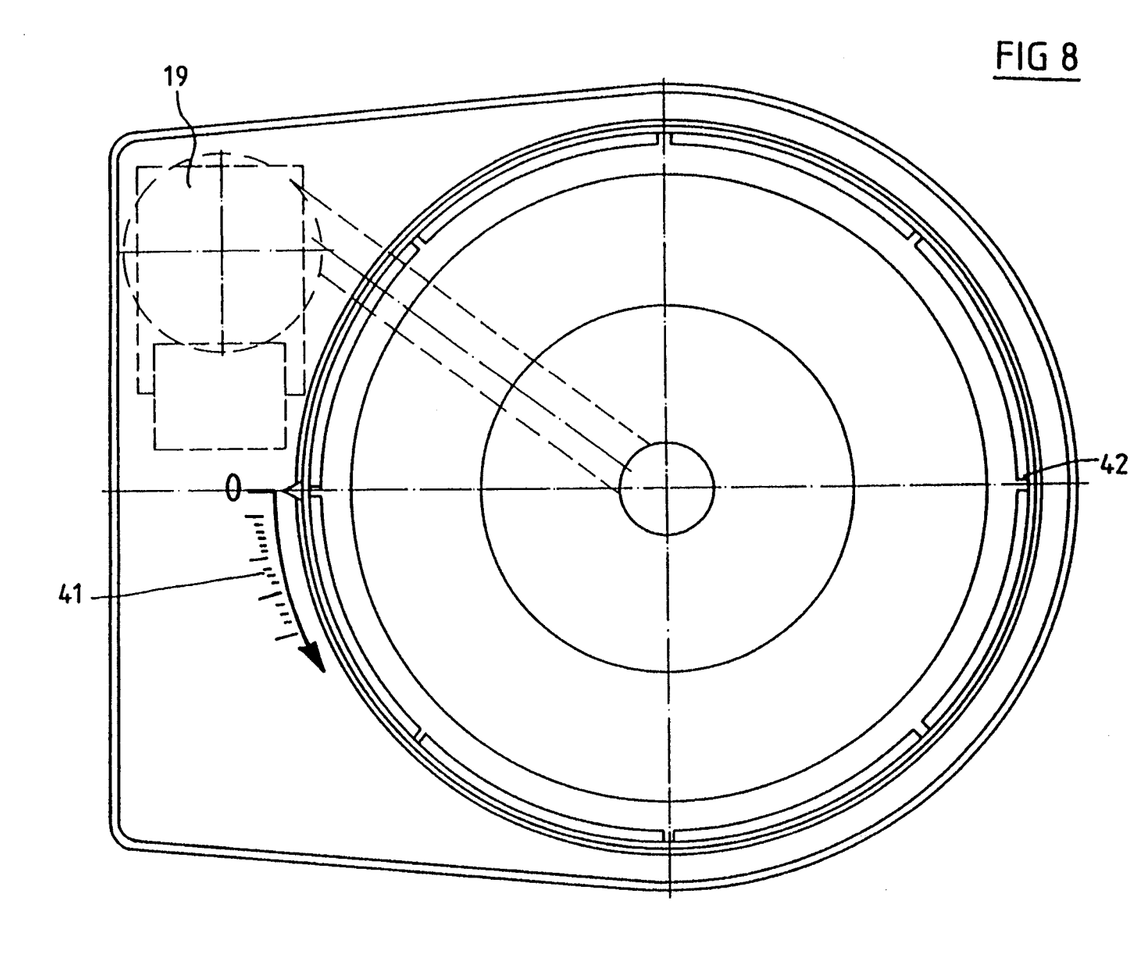
FIG. 8. is a plan view of the version according to FIG. 7.

A version is depicted in FIGS. 7 and 8 whose basin rim is vertically displaceable so that the total volume of the bath can be selected within certain limits. The supply reservoir 5 for the liquid 3 consists likewise of a vessel, on the bottom of which is arranged a heating or a cooling device 8. Similar to other versions the immersion pump 19 is so arranged that the heating element cannot be exposed to air.

The basin 4 is not, however, formed as a lid which closes-off the supply reservoir 5. The basin is rather set into a covering frame 39, which is placed upon the supply reservoir 5. The bath has a rotationally symmetrical shape, but could also have another shape or layout.

The basin is formed in two parts, comprising a basin body 32 which rests slightly above the bottom of the supply reservoir 5, on supports 43. In the middle the basin body is tapered like a funnel to a riser 44, which forms a component part of the feed pipe 6. The riser opens out into a firmly fixed bottom connecting sleeve 47, from where a pipe leads to the immersion pump 19. The entire bath 4 can thus be easily lifted off the supply reservoir, which greatly facilitates dismantling and cleaning.

Further, the basin 4 possesses a vertically displaceable basin rim 33, which is guided on the outside of the bath body 32. At the same time the upper part of the bath rim is formed as a hollow wall, the inside rim 38 of which forms an overflow 34 for the liquid. The outer rim of the hollow wall 37 is slightly higher than the inner rim 38 so that the overflow is protected, and the liquid is prevented from flowing over the covering frame. The liquid returns to the supply reservoir 5 inside the hollow wall. The outer wall 37 is attached to the inner wall 38 by radial fins 42, as can be observed in FIG. 8.

The guide surface between the inner wall 38 and the side-wall of the basin body 32 is so formed that a thin liquid film can form there. This liquid film considerably reduces the friction, so that the bath rim can be displaced without effort.

Integral with the inner wall 38 is a float 35, acting vertically within the basin body 32. This is formed as a hollow ring, with an open underside, whereby the inner wall of the hollow ring is tapered like a cone. At the same time this configuration enables glass flasks to be effortlessly placed in the bath without support. The float 35 exerts buoyancy onto the displaceable basin rim 33 so that the basin rim 33 is moved from its lower resting position to its upper operating position when the bath 4 is filled through the riser 44. A mechanical stop is provided in order to adjust the desired liquid level or the upper operating position. The limit position of the mechanical stop can be set by rotating the displaceable bath rim around its axis.

As depicted, the covering frame 39 is equipped with a protuberence 48 which surrounds the outer wall 37 of the basin rim 33. This protuberence possesses a guide curve 40 which extends through slightly more than 180 degrees. A mechanical stop 36 is arranged on the outer wall 37, which operates in conjunction with the guide curve 40. The bath rim 33 can be displaced through either a large or a small stroke H, depending upon the angle of the mechanical stop in relation to the guide curve. The mechanical stop 36 is depicted in the lower position 45 in FIG. 7, in which position no displacement of the bath rim will ensue when the bath 4 is filled, the entire basin rim 33 with its float 35 will remain in the lowest position. The mechanical stop 36 can be set in the highest position 46 by rotating the bath rim 33 through 180 degrees, so that the maximum displacement stroke will ensue when filling the bath 4 with liquid. The highest possible position of the basin rim is depicted by a dotted line. As can be observed in FIG. 8, a scale 41 can be provided on the covering frame 39 on which the desired stroke can be either set or read-off. Obviously, the stroke limitation can be realised in other ways.

The outer dimensions of the device according to the version depicted in FIGS. 7 and 8 can be further optimised. The height of the bath can be conveniently adjusted to suit the object to be immersed, whereby the bath rim is always in the lowest position when not in operation.

Obviously the device according to this invention can be used for other purposes and is not limited to rotary evaporators.

Furthermore, other suitable heat conducting liquids, apart from oil and water, can be employed.

Since the basin may be used either to heat or cool a flask depending on whether the liquid is heated or refrigerated in the reservoir, the liquid is referred to as "thermally conditioned" in the claims that follow.

I claim:

1. A rotary evaporator including a support for supporting and rotating a reaction flask containing a substance to be evaporated, and a heating bath beside the support, said heating bath comprising a basin for containing a thermally conditioned liquid, said basin having an open upper side, a supply reservoir for the thermally conditioned liquid, said reservoir being arranged under the basin in such a way that the basin serves as a lid covering the supply reservoir, a feed pipe for delivering the thermally conditioned liquid from the supply reservoir to the basin, said feed pipe being connected with an inlet opening at the bottom of the basin, a liquid outlet on the basin, in the form of an overflow through which the thermally conditioned liquid can return to the supply reservoir from the basin, means in the supply reservoir for thermally conditioning said liquid, and an immersion pump connect to said feed pipe for continuously delivering the thermally conditioned liquid from the supply reservoir into the basin, said pump allowing the basin to empty back through the pump when the pump is deactivated, wherein the supply reservoir has a volume sufficient to receive the entire contents of the basin when the pump is deactivated, and the fill of thermally conditioned liquid being such that the bath is emptied when the immersion pump is interrupted, whereby the support holds the reaction flask in a fixed position at least partially within the basin and immersed in the thermally conditioned liquid when the pump is activated.

2. The invention of claim 1, wherein the overflow comprises a continuously adjustable gate, whereby maximum liquid level in the level can be adjusted.

3. The invention of claim 1, wherein the overflow comprises a height-adjustable slider in the basin wall.

4. The invention of claim 1, wherein the overflow is a vertically displaceable rim on the basin.

5. The invention of claim 4, wherein the displaceable rim is guided on the basin.

6. The invention of claim 5, wherein the displaceable rim has a float, disposed within the basin, and having sufficient buoyancy to displace the rim from a lower rest position to an upper operating position as liquid in introduced into the basin.

7. The invention of claim 6, wherein the float comprises means defining a hollow chamber with an open bottom.

8. The invention of claim 6, wherein the displaceable rim comprises a hollow wall in which the liquid can be returned to the supply reservoir, said hollow wall having an inner rim forming an overflow and an outer rim slightly higher than the inner rim.

9. The invention of claim 5, further comprising an adjustable stop for adjusting the upper operating position of the displaceable rim.

10. The invention of claim 2, wherein at least of portion of the basin rim is inclined from the horizontal, and the overflow is formed as a side wall, which is slidable within the basin along the length of the slope, whereby liquid flows over the basin rim at its lowest point as determined by the side wall position.

* * * * *